(12) United States Patent
Akiba

(10) Patent No.: US 6,503,473 B1
(45) Date of Patent: Jan. 7, 2003

(54) PROCESS FOR SEPARATING SOLID COMPOUND OTHER THAN LITHIUM HYDROXIDE

(75) Inventor: Iwao Akiba, Ichihara (JP)

(73) Assignees: Idemitsu Petrochemical Co., Ltd., Tokyo (JP); Petroleum Energy Center (PEC), Tokyo (JP)

( * ) Notice: Subject to any disclaimer, the term of this patent is extended or adjusted under 35 U.S.C. 154(b) by 0 days.

(21) Appl. No.: 09/514,281

(22) Filed: Feb. 28, 2000

(30) Foreign Application Priority Data

Mar. 8, 1999 (JP) .......................................... 11-059617

(51) Int. Cl.$^7$ .............................................. C01B 17/28
(52) U.S. Cl. .................... 423/560; 423/179.5; 423/184; 423/499.1; 423/499.4; 423/499.5
(58) Field of Search .............................. 423/560, 179.5, 423/184, 499.1, 499.4, 499.5; 528/381, 387

(56) References Cited

U.S. PATENT DOCUMENTS

| | | | |
|---|---|---|---|
| 4,919,911 A | * 4/1990 | Shirota et al. | 423/499 |
| 5,262,137 A | * 11/1993 | Suzuki et al. | 423/179.5 |
| 5,635,587 A | * 6/1997 | Koyama et al. | 528/381 |

FOREIGN PATENT DOCUMENTS

| | | | | |
|---|---|---|---|---|
| JP | 63-139007 | * 6/1988 | | 423/560 |

* cited by examiner

*Primary Examiner*—Stanley S. Silverman
*Assistant Examiner*—Timothy C. Vanoy
(74) *Attorney, Agent, or Firm*—Oblon, Spivak, McClelland, Maier & Neustadt, P.C.

(57) ABSTRACT

A process for separating a solid compound other than lithium hydroxide, such as sodium chloride, in which lithium hydroxide is hydrosulfurized by bubbling gaseous hydrogen sulfide through an aprotic solvent, such as a polar organic compound, containing lithium hydroxide and the solid compound other than lithium hydroxide, solid-liquid separation is conducted under a condition in which the reaction of lithium hydrosulfide to lithium sulfide and hydrogen sulfide is suppressed and at a temperature of the liquid for separation at 50 to 150° C., and the separated crystal cake is further washed with the aprotic solvent to highly recover lithium hydrosulfide.

9 Claims, 1 Drawing Sheet

PROCESS FOR SEPARATING SOLID COMPOUND OTHER THAN LITHIUM HYDROXIDE

BACKGROUND OF THE INVENTION

1. Field of the Invention

The present invention relates to a process for separating non-lithium hydroxide solid compounds in which gaseous hydrogen sulfide is bubbled through an aprotic solvent containing solid lithium hydroxide and solid compounds other than lithium hydroxide (namely, non-lithium hydroxide solid compounds) to convert lithium hydroxide into lithium hydrosulfide soluble in the aprotic solvent.

2. Description of the Related Art

In processes for producing a polyarylene sulfide resin (hereinafter, referred to as PAS) using a lithium compound (e.g., U.S. Pat. No. 5,635,587), an expensive lithium compound must be recycled. Lithium is dissolved as lithium chloride in a polymerization reaction solution of PAS, and is recovered in the form of a crystal of lithium hydroxide by adding an equivalent-molar or more sodium hydroxide to lithium chloride. However, since sodium chloride in equivalent molar to lithium hydroxide precipitates as a crystal simultaneously, if lithium hydroxide is recycled without any treatment to the polymerization system of PAS, sodium chloride insoluble in an aprotic solvent used as a polymerization medium is incorporated in the PAS resin. Therefore, there is a need to separate lithium hydroxide and another solid compound (namely, non-lithium hydroxide solid compound such as sodium chloride and the like) presence on the aprotic solvent obtained by treating the polymerization reaction solution of PAS with sodium hydroxide.

As this process, there are known, (1) a process in which a large amount of water is added to a system composed of lithium hydroxide, other solid compounds and an aprotic solvent, and separation is conducted by utilizing a difference in degrees of solubility into water of the solid compounds, and (2) a process in which gaseous hydrogen sulfide is bubbled through an aprotic solvent containing lithium hydroxide and other solid compounds, and hydrogen sulfide and lithium hydroxide are reacted to synthesize a complex soluble in the aprotic solvent (e.g., N-methyl-2-pyrrolidone (hereinafter, may abbreviated as NMP)) which is separated (U.S. Pat. No. 5,635,587).

However, in the process (1), since the difference in degrees of solubility of lithium hydroxide and sodium chloride in water is small, separation efficiency is extremely poor. In addition, there is also a problem of a large amount of water remaining in the system. Further, in examples specifically disclosed as the process (2) of bubbling of gaseous hydrogen sulfide, there are disclosed a solid-liquid separation operation in which a reaction mixture after bubbling of gaseous hydrogen sulfide is poured on a glass filter kept at 130° C. to be filtrated under reduced pressure, and an operation in which the residue out he filter is washed using NMP at 130° C. However, since the S (sulfur)/Li (lithium) ratio (molar ratio) in the reaction system after bubbling of gaseous hydrogen sulfide is 0.65, it is hypothesized that a fair amount of lithium sulfide ($Li_2S$) has been produced. Further, in solid-liquid separation, a filtration operation under reduced pressure, which tends to produce lithium sulfide, is adopted. Since lithium sulfide is insoluble in NMP, the problem of recovering a loss of lithium compounds is not supposed to be solved completely even if the above-described solid-liquid separation operation and washing operation are carried out at 130° C.

The object of the present invention is to provide a process in which gaseous hydrogen sulfide is bubbled through an aprotic solvent containing solid lithium hydroxide and solid compounds other than lithium hydroxide (namely, non-lithium hydroxide solid compounds) to convert lithium hydroxide into lithium hydrosulfide soluble in the aprotic solvent before separation of the non-lithium hydroxide solid compounds by solid-liquid separation, wherein the recovering loss of lithium compounds is reduced.

SUMMARY OF THE INVENTION

The present inventor has intensively studied the above-described problems, and resultantly found that it is possible, in the above-described process for separating non-lithium hydroxide solid compounds, that lithium hydroxide is converted by using gaseous hydrogen sulfide into lithium hydrosulfide soluble in an aprotic solvent, solid-liquid separation is conducted, then, the separated crystal cake is washed with an aprotic solvent to recover, effectively, lithium hydrosulfide contained in the crystal cake, and completed the present invention based on this finding. The summary of the invention is as follows.

[1] A process for separating a non-lithium hydroxide solid compound in which gaseous hydrogen sulfide is bubbled through an aprotic solvent containing solid lithium hydroxide and a solid compound other than lithium hydroxide (namely, non-lithium hydroxide solid compound) to convert lithium hydroxide into lithium hydrosulfide soluble in the aprotic solvent before separation of the non-lithium hydroxide solid compound by solid-liquid separation, wherein the separated crystal cake is washed with the aprotic solvent to recover lithium hydrosulfide contained in the crystal cake.

[2] The process for separating a non-lithium hydroxide solid compound according to [1], wherein the solid-liquid separation is conducted under the condition in which the de-hydrogen sulfide reaction of lithium hydrosulfide is suppressed and at a temperature of the liquid separated at 50 to 150° C.

[3] The process for separating a non-lithium hydroxide solid compound according to [1] or [2], wherein at least a part of the washing liquid (namely, aprotic solvent) used for washing of the crystal cake separated is recycled to a hydrosulfurization step of lithium hydroxide or a washing step of the crystal cake.

DETAILED DESCRIPTION OF THE PREFERRED EMBODIMENTS

Figure 1:
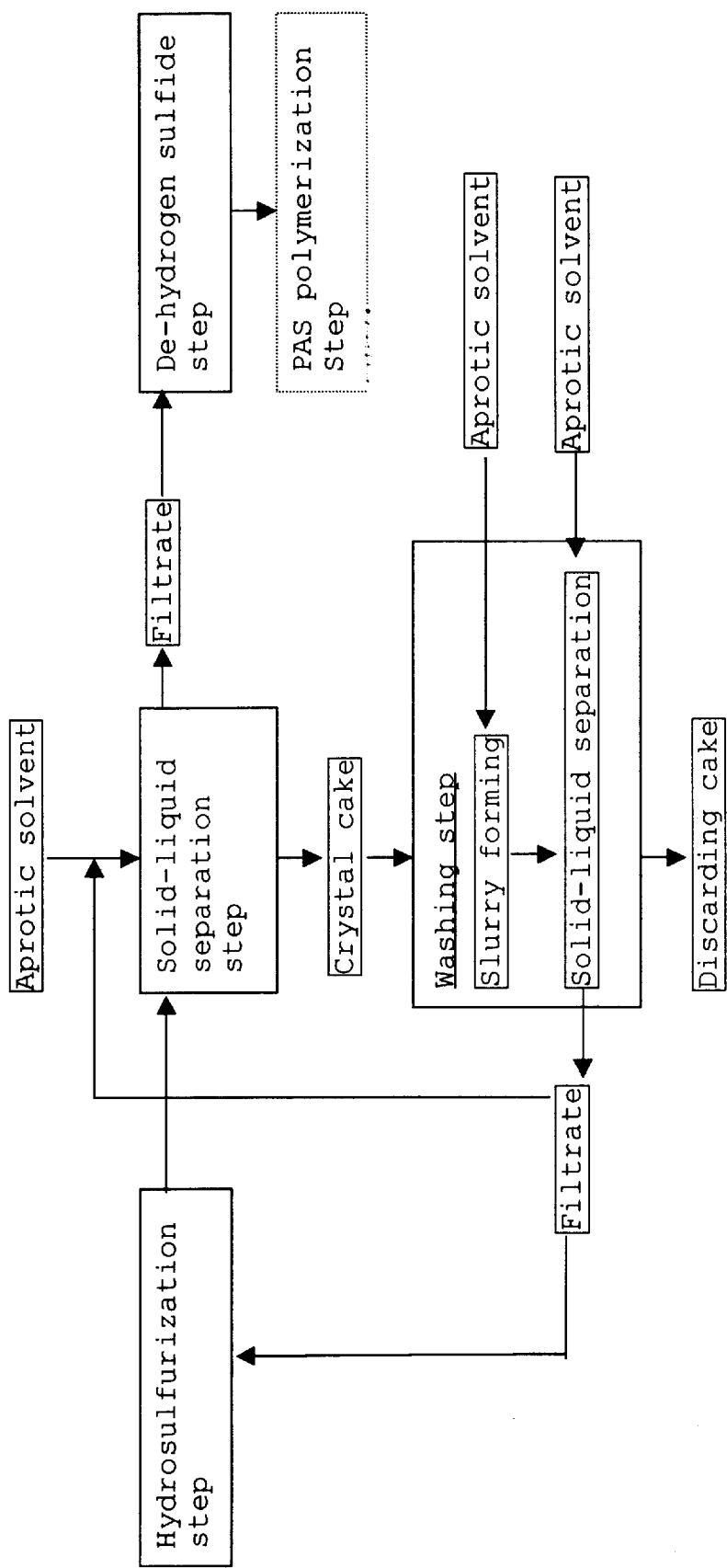
FIG. 1 is a schematic view showing a production process of lithium sulfide utilizing the process of the present invention for separating a non-lithium hydroxide solid compound.

The process for separating a non-lithium hydroxide solid compound of the present invention will be described below referring to FIG. 1 showing the flow from a hydrosulfurization step of lithium hydroxide to a production step of lithium sulfide by de-hydrogen sulfide of lithium hydrosulfide.

Hydrosulfurization Step

This is a step in which gaseous hydrogen sulfide is bubbled through an aprotic solvent containing solid lithium hydroxide and non-lithium hydroxide solid compounds to convert lithium hydroxide into lithium hydrosulfide soluble in the aprotic solvent. The reaction mixture produced in this step is a raw material of the following process, solid-liquid separation step.

Namely, the hydrosulfurization step is mainly composed of a reaction rep resented by the following reaction formula.

LiOH+H$_2$S→LiSH+H$_2$O

1 Reaction Condition

The reaction is usually conducted at conditions of a pressure from 3 kPa to 0.2 MPa and a temperature from 0 to 200° C., preferably a pressure from 0.1 MPa to 0.2 MPa and a temperature from 50 to 150° C. When the reaction pressure is over 0.2 MPa, the specification of a pressure vessel used for this reaction becomes stricter still causing an economic disadvantage. When the temperature is lower than 0° C., the solubility of lithium hydroxide is low, and when an azeotrope with water is used, the concentration of the azeotrope in liquid phase increases and the degree of solubility of lithium hydroxide decreases further, and the like, rendering the progress of the hydrosulfurization reaction difficult. Further, the viscosity of the produced lithium hydrosulfide solution increases steeply, and the hydrosulfurization reaction is delayed remarkably. When the reaction temperature is over 200° C., the pressure in the reaction system increases undesirably, in addition, there is a fear of a reverse influence due to the decomposition of an aprotic solvent. Also, the production amount of lithium sulfide increases. Since lithium sulfide is not dissolved in the aprotic solvent, a solid compound is formed, separation and recovering become difficult, and the recovering loss of lithium compounds increases.

2 Lithium Hydroxide

Solid lithium hydroxide used in the present invention may be anhydrous or contain water. However, lithium hydroxide obtained by adding NaOH to lithium chloride produced together with the polymerization reaction in PAS polymerization reaction is usually used.

3 Non-lithium Hydroxide Solid Compound

The non-lithium hydroxide solid compound separated in the present invention is composed almost of sodium chloride, and may sometimes contain a trace amount of a PAS polymer, PAS oligomer and the like. Usually, lithium sulfide used in the polymerization step of PAS is itself converted into lithium chloride by incorporation of sulfur into the polymer. Namely, lithium sulfide acts as a sulfur carrier. When NaOH is added to lithium chloride, lithium hydroxide and sodium chloride are produced, and both of them are insoluble in an aprotic solvent, forming solid compounds.

4 Aprotic Solvent

As the aprotic solvent used in the present invention, in general, aprotic polar organic compounds (e.g., amide compounds, lactam compounds, urea compounds, organic sulfur compounds, cyclic organo phosphorus compounds and the like) can be preferably used as a single solvent or mixed solvent. Of these non-protonic polar organic compounds, included as examples of the above-described amide compound are N,N-dimethylformamide, N,N-diethylformamide, N,N-dimethylacetamide, N,N-diethylacetamide, N,N-dipropylacetamide, N,N-dimethylbenzoic amide and the like.

Given as examples of the above-described lactam compound are N-alkyl caprolactams such as N-methyl caprolactam, N-ethyl caprolactam, N-isopropyl caprolactam, N-isobutyl caprolactam, N-normalpropyl caprolactam, N-normalbutyl caprolactam, N-cyclohexyl caprolactam and the like, N-alkylpyrrolidones such as N-methyl-2-pyrrolidone (NMP), N-ethyl-2-pyrrolidone, N-isopropyl-2-pyrrolidone, N-isobutyl-2-pyrrolidone, N-normalpropyl-2-pyrrolidone, N-normalbutyl-2-pyrrolidone, N-cyclohexyl-2-pyrrolidone, Nmethyl-3-methyl-2-pyrrolidone, N-ethyl-3-methyl-2-pyrrolidone, N-methyl-3,4,5-trimethyl-2-pyrrolidone and the like, N-alkylpyperidones such as N-methyl-2-piperidone, Nethyl-2-piperidone, N-isopropyl-2-piperidone, N-methyl-6-methyl-2-piperidone, N-methyl-3-ethyl-2-piperidone and the like.

Examples of the above-described organic sulfur compound include dimethylsulfoxide, diethylsulfoxide, diphenylenesulfone, 1-methyl-1-oxosulfolane, 1-ethyl-1-oxosulfolane, 1-phenyl-1-oxosulfolane and the like.

These various non-protonic polar organic compounds can be used each alone or in admixture of two or more, or in admixture with another solvent component which does not disturb the object of the present invention, as the above-described non-protonic organic compound.

Of the above-described non-protonic organic compounds, N-alkyl caprolactam and N-alkyl pyrrolidone are preferable, and N-methyl-2-pyrrolidone is particularly preferable.

5 Hydrogen Sulfide

There are no specific restrictions to hydrogen sulfide used in the present invention.

6 Use Ratio

The use ratio of lithium hydroxide to hydrogen sulfide in the hydrosulfurization step is, in terms of lithium hydroxide/hydrogen sulfide molar ratio, usually from 0.2 to 3.0, preferably from 0.2 to 2.0, further preferably from 0.5 to 2.0 or 0.3 to 1.5, particularly preferably from 0.3 to 1.1. The reason for this is that the hydrosulfurization reaction progresses more smoothly when the above-described use ratio is within this range.

7 Production Lithium Hydrosulfide

The reaction apparatus is preferably that which is equipped with a stirring means and which has a condenser at the upper part. As the reaction apparatus or the reaction bath, that of complete mixing bath type, suspension bubble tower type, filling tower type, plate tower type or the like or combination type thereof and having single stage or multi stages can be used.

Under the above-described reaction conditions, gaseous hydrogen sulfide is bubbled through an aprotic solvent containing lithium hydroxide and non-lithium hydroxide solid compounds to hydrosulfurize lithium hydroxide.

There are no specific restrictions to the bubbling pressure, bubbling speed and further bubbling method of gaseous hydrogen sulfide, and the bubbling time is required to be not less than the time obtained by dividing the necessary amount calculated from the above-described use ratio of hydrogen sulfide by the bubbling speed, namely, it is necessary to bubble gaseous hydrogen sulfide in a surplus amount based on the raw material, lithium hydroxide.

Solid-liquid Separation Step

This step is a step for separating solid compounds present in the system after completion of the reaction in the above-described hydrosulfurization step with lithium hydrosulfide dissolved in an aprotic solvent produced in the hydrosulfurization step. The separated solid compounds are further treated in the following washing step. The separated liquid substance is used as a raw material in a de-hydrogen sulfide step described later.

As the solid-liquid separation apparatus used in the present invention, a filtration apparatus, a centrifugal separator and the like can be used.

The solid-liquid separation is conducted preferably under the condition wherein the de-hydrogen sulfide reaction of lithium hydrosulfide is suppressed and at a temperature preferably from 50 to 150° C., particularly preferably from 70 to 100° C. The reason why solid-liquid separation is carried out under the condition wherein the de-hydrogen sulfide reaction is suppressed is that formation of lithium sulfide which is produced by the de-hydrogen sulfide reaction of lithium hydrosulfide dissolved in an aprotic solvent should be suppressed. When lithium sulfide is produced, it is separated into a solid side due to the insolubility into an aprotic solvent, leading to the recovering loss of lithium compounds. Therefore, it is preferable to conduct liquid-solid separation without heating the reaction mixture to a temperature over the reaction temperature in the hydrosulfurization step, conducting filtration under reduced pressure, bubbling an inert gas, or the like. The reason for this is described below.

The de-hydrogen sulfide reaction of lithium hydrosulfide is represented by the following formula, though also described in a de-hydrogen sulfide step described later.

$2LiSH \rightarrow Li_2S + H_2S$

When heated to or m ore than the production reaction temperature of lithium hydrosulfide, the degree of solubility of hydrogen sulfide in a solvent decreases, and the above-described reaction tends to progress to the right side increasing the production amount of lithium sulfide. Likewise, also when pressure is reduced, the degree of solubility of hydrogen sulfide in a solvent decreases. Further, bubbling of an inert gas reduces the partial pressure of gaseous hydrogen sulfide in a solvent, and the same influence as that in pressure reduction occurs. Therefore, it is preferable to conduct liquid-solid separation without heating the reaction mixture to a temperature over the reaction temperature in the hydrosulfurization step, conducting filtration under reduced pressure, bubbling an inert gas, or the like. Namely, it is preferable, for reduction of the recovering loss of lithium compounds, to conduct such an operation in that the concentration of hydrogen sulfide present in a solvent in completion of the hydrosulfurization step does not lower so much.

A reaction temperature lower than 50° C. is not preferable since the viscosity of an aprotic solvent containing lithium hydrosulfide increases steeply, rendering filtration and centrifugal separation difficult, and a reaction temperature over 150° C. is not preferable since the de-hydrogen sulfide of lithium hydrosulfide progresses and lithium sulfide is produced, increasing the recovering loss of lithium compounds, as described above.

In the present process, if necessary, it may also be allowable to add the aprotic solvent described in the hydrosulfurization step or the washing solution recovered in the washing step, for solid-liquid separation.

Washing Step

Usually, the liquid content of a crystal cake obtained by solid-liquid separation is as high as 50% or more, and lithium hydrosulfide dissolved in an adhesion mother liquid (namely, lithium hydrosulfide dissolved in a solvent adhere to a crystal cake) will be lithium compounds unrecovered. Then, in the present invention, lithium hydrosulfide contained in a crystal cake is recovered by washing the separated crystal cake with an aprotic solvent. This is the washing step.

More specifically, solid-liquid separation is conducted while washing with an aprotic solvent, or alternatively, the separated crystal cake is again made into slurry condition with an aprotic solvent, and washed. There are no specific restrictions to the amount of a washing liquid and the washing frequency, though the recovering rate of lithium increases when they are increased. As the aprotic solvent, compounds listed in the explanation of the hydrosulfurization step can be used. As the washing method, there can be specifically adopted the following methods for example.

To a crystal cake recovered in the solid-liquid separation step is added an aprotic solvent in a 0.5 to 5.0-fold amount by weight, the mixture is washed by stirring at not more than the same temperature as the reaction temperature in the hydrosulfurization step, and solid-liquid separation is again conducted in the same manner as described above. This procedure is preferably conducted 2 to 3 times.

The amount of an aprotic solvent added to a crystal cake in washing is preferably from 0.5 to 5.0-fold amount by weight, particularly preferably from 1.0 to 3.0-fold amount by weight, as described above. When the amount is less than 0.5-fold amount, a preferable washing effect may not be obtained, and when over 5.0-fold amount, the amount of a solvent used increases and the treatment thereof requires work and cost.

The washing temperature is preferably from 50 to 120° C., particularly preferably from 70 to 100° C. When the washing temperature is lower than 50° C., the viscosity in the washing system is high, possibly causing poor washing efficiency, and when washing is conducted at a temperature over 120° C., the de-hydrogen sulfide reaction of lithium hydrosulfide progresses, increasing the recovering loss of lithium compounds, as described above.

There are no specific restrictions to the method for mixing a washing solvent (namely, aprotic solvent) with a crystal cake, and preferable is washing by mixing so that a crystal cake is dispersed uniformly in a washing solvent. There are no specific restrictions to the stirring speed and the washing time, and they can be appropriately set.

The washing operation is preferably conducted under the atmosphere of an inert gas or gaseous hydrogen sulfide. When the washing operation is conducted in air (namely, in the presence of oxygen), there is a possibility that lithium hydrosulfide is oxidized to produce a sulfur oxide of lithium, increasing the recovering loss of lithium compounds.

After washing, at least a part of all of the recovered washing liquid can be recycled to a hydrosulfurization step, solid-liquid separation step and a washing step.

De-hydrogen Sulfide Step

For explanation of the utility of the separation process of the present invention, for explanation of the de-hydrogen sulfide reaction of lithium hydrosulfide, the de-hydrogen sulfide step is described below.

The de-hydrogen sulfide step is a step for converting lithium hydrosulfide recovered in the solid-liquid separation step into lithium sulfide.

If the de-hydrogen sulfide reaction is progressed by heating an aprotic solvent containing lithium hydrosulfide or by heating and bubbling an inert gas, lithium sulfide is produced.

Namely, the de-sulfurization step is mainly composed of a reaction represented by the following reaction.

$2LiSH \rightarrow Li_2S + H_2S$

For promoting further the conversion of lithium hydrosulfide remaining in the reaction system into lithium sulfide, the de-hydrogen sulfide is progressed while heating, or heating and bubbling an inert gas. The reaction temperature is preferably from 150 to 250° C., particularly preferably from 170 to 220° C. The are no specific restrictions to the inert gas, and usually, a nitrogen gas can be preferably used.

Also, there are no specific restrictions to this inert gas bubbling pressure. The bubbling may be conducted at normal pressure. The bubbling speed is also not restricted. The bubbling time or the heating time can be confirmed by measuring the concentration of unreacted lithium hydrosulfide in the liquid, usually, and is prehensible by the relation with the reaction time.

After completion of the reaction, a slurry containing lithium sulfide is recovered, and usually used as a sulfur carrier used in the polymerization process of polyarylene sulfide.

EXAMPLES

The following examples further illustrate the present invention in detail.

Example 1

Into a 500 ml glass separable flask equipped with a stirrer and a condenser was charged 120 g of N-methyl-2-pyrrolidone (NMP) and 187.6 g of a wet cake having a liquid content of 56% by weight and containing each 1 mol of lithium hydroxide and sodium chloride, and the mixture was heated to 130° C. while stirring at 550 rpm. The wet cake was recovered using a filtration method under reduced pressure from a mixture containing lithium hydroxide and sodium chloride which were precipitated by adding sodium hydroxide(48 wt % aqueous solution) to a NMP solution of lithium chloride, wherein the amount of sodium hydroxide added was equivalent in molar to lithium chloride. The particle size distribution of a crystal obtained by drying the wet cake was from 10 to 100 μm.

After the temperature was raised to 130° C., gaseous hydrogen sulfide was fed at a rate of 400 ml/min. for 180 minutes. The temperature and the stirring speed during bubbling of hydrogen sulfide were controlled to 130° C. and 550 rpm, respectively. The slurry was sampled with the lapse of time, and the lithium compounds contained in the slurry, namely, LiOH, LiSH and $Li_2S$, were quantified by a potentiometric titration method. Lithium and sodium in the liquid were analyzed by ion chromatography and the water content was analyzed by gas chromatography. When the feeding of gaseous hydrogen sulfide was initiated, the liquid was changed immediately to dark blue giving recognition of a lithium complex. Solid compounds were remained in the system even after 180 minutes. The conversion of lithium hydroxide 60 minutes after the initiation of bubbling of gaseous hydrogen sulfide was 97.8%, the selectivity of lithium hydrosulfide was 100%, and the water content was 9.8%. Further, the conversion of lithium hydroxide 90 minutes was 100%, the selectivity of lithium hydrosulfide was 95.3%, and the water content was 8.2%, and the production of a trace amount of lithium sulfide was recognized. Then, the reaction mixture was filtrated through a glass filter kept at 130° C. The liquid content of the wet cake obtained by the filtration was 54.8% by weight, and the lithium recovering rate calculated from the amount of lithium compounds present in the filtrate was 85%. The filtrated material on the filter was washed further with a large quantity of NMP at 130° C. The lithium concentration in the washed solution eluted from the cake by the washing was 24 wt. ppm, and the lithium recovering rate was improved to 99% by washing with NMP. Further, the sodium concentration in the liquid after solid-liquid separation was 0.74 wt %, and the sodium chloride removal rate was 96%. In this example, a part of the washing liquid was recycled for washing of the cake.

The lithium-recovering rate is a value represented in terms of weight percentage of the ratio of the amount of lithium charged in the form of lithium hydroxide into the separable flask to the amount of lithium in the lithium compounds present in the filtrate.

Example 2

120 g of NMP and a NMP solution of lithium chloride were charged into a reaction apparatus which was composed of a 500 ml glass separable flask, a stirrer and a condenser equipped at the upper part of the flask, wherein the apparatus had a function of simple distillation. Sodium hydroxide in equivalent molar to lithium chloride was added as 48 wt % aqueous solution to obtain a reaction mixture containing lithium hydroxide and sodium chloride precipitated (each 1 mol). Then, the system was evacuated to 0.2 kPa and the temperature was elevated to 130° C. to conduct dehydration. The dehydration was conducted until distillation from the condenser was stopped. Through the slurry dehydrated gaseous hydrogen sulfide was bubbled in a surplus amount based on lithium hydroxide to synthesize lithium hydrosulfide at 100° C. Before the bubbling of gaseous hydrogen sulfide, the slurry was composed of a white crystal and a transparent supernatant. The color of the slurry was changed to dark blue simultaneously with the bubbling. The bubbling of gaseous hydrogen sulfide was continued until the solid lithium hydroxide was disappeared. During which, bubbling was effected for about 60 minutes at a stirring speed of 350 rpm and a bubbling speed of gaseous hydrogen sulfide of 1000 ml/min. The conversion of lithium hydroxide 60 minutes after the initiation of bubbling of gaseous hydrogen sulfide was 100%, and the selectivity of lithium hy sulfide was 100%. Further, the selectivity of lithium hydrosulfide 120 minutes or more after was also 100%. The remaining water content was 4.1% by weight. Then, the resulted mixture was filtrated using a glass filter kept at 100° C. The liquid content of the wet cake obtained by the filtration was 63.2 wt %, and the recovering rate of lithium at this point was 67%. The filtrated material on the filter was further washed with a large amount of NMP at 100° C. The lithium-recovering rate was improved to 99% by washing with NMP. Further, the sodium concentration in the liquid after solid-liquid separation was 0.59 wt %, and the sodium chloride removal rate was 97%. In this example, a part of the washing liquid was recycled for washing of the cake.

Comparative Example 1

A mixture containing lithium hydrosulfide produced in the same manner as in Example 1 was tried to be filtrated using a glass filter kept at 40° C., resulting in failure of filtration due to too high viscosity of the slurry. Filtration was conducted while the penetrated side being sucked to find incomplete solid-liquid separation. As a generation of bubble from the surface on the penetrated side of the glass filter was found during the suction filtration, a part of the wet cake was removed and analyzed by a potentiometric titration method to confirm the production of lithium sulfide. As the cause of the production of lithium sulfide, there is envisaged reduction in the degree of solubility of hydrogen sulfide in a solvent by the filtration under reduced pressure as described above.

Comparative Example 2

A mixture before bubbling of hydrogen sulfide was produced in the same manner as in Example 1. The temperature was raised to 158° C. in this experiment while the temperature was raised to 130° C. in Example 1. Gaseous hydrogen sulfide was bubbled at 158° C. and lithiumhydrosulfide was synthesized. The stirring speed in this procedure was 350 rpm, and the bubbling speed of gaseous hydrogen sulfide was 1000 ml/min. and the bubbling time was 60 minutes. The conversion of lithium hydroxide 60 minutes after the initiation of bubbling of gaseous hydrogen sulfide was 68.8%, and the selectivity of lithium hydrosulfide was 100%. Further, the conversion of lithium hydroxide 120 minutes or more after was 100%, the selectivity of lithium hydrosulfide was 85.5%, and the selectivity of lithium sulfide was 14.5%. Thus, the production amount of lithium sulfide increased as compared with that in Example 1.

The resulted mixture was filtrated using a glass filter kept at 158° C. The liquid content of the wet cake obtained by the filtration was 62.3 wt %. The lithium-recovering rate at this point was 56%. The filtrated material on the filter was further washed with a large amount of NMP at 100° C. Even if washed with NMP, the lithium-recovering rate was increased only to 85%. The crystal after the washing was analyzed by a potentiometric titration method to confirm the presence of lithium sulfide.

According to the present invention, the recovering rate of lithium hydrosulfide was as high as 99% by weight, meaning remarkable improvement in recovering rate as compared with 60%s by weight in conventional methods.

What is claimed is:

1. A process comprising
   (1) bubbling gaseous hydrogen sulfide through an aprotic solvent containing solid lithium hydroxide and a solid compound other than lithium hydroxide (hereinafter "non-lithium hydroxide solid compound") to convert substantially all lithium hydroxide into a lithium hydrosulfide soluble in the aprotic solvent at a pressure of 0.1 MPa to 0.2 MPa,
   (2) separating the non-lithium hydroxide solid compound by solid-liquid separation in the form of a crystal cake at a temperature from 70° to 100° C., and
   (3) washing the crystal cake with the aprotic solvent to recover lithium hydrosulfide contained in the crystal cake at a temperature from 50° to 120° C.,
   wherein lithium is recovered at a lithium-recovering rate of over 85%.

2. The process according to claim 1, wherein the solid-liquid separation is conducted under the condition in which the reaction of lithium hydrosulfide to lithium sulfide and hydrogen sulfide is suppressed.

3. The process according to claim 1, wherein at least a part of the washing liquid used for washing of the crystal cake is recycled to the bubbling step or the washing step of the crystal cake.

4. The process according to claim 2, wherein at least a part of the washing liquid used for washing of the crystal cake is recycled to the bubbling step or the washing step of the crystal cake.

5. The process according to claim 2, wherein the lithium hydroxide to gaseous hydrogen sulfide molar ratio is in the range from 0.2 to 2.0.

6. The process according to claim 5, wherein the lithium hydroxide to gaseous hydrogen sulfide molar ratio is in the range from 0.3 to 1.5.

7. The process according to claim 6, wherein the lithium hydroxide to gaseous hydrogen sulfide molar ratio is in the range from 0.3 to 1.1.

8. The process according to claim 7, wherein solid-liquid separation is conducted without reducing pressure or bubbling an inert gas.

9. A process for recovering lithium hydrosulfide comprising the steps of:
   (a) bubbling gaseous hydrogen sulfide through an aprotic solvent containing solid lithium hydroxide and solid sodium chloride until the lithium hydroxide to gaseous hydrogen sulfide molar ratio reaches 0.3 to 1.5 to convert substantially all lithium hydroxide into lithium hydrosulfide,
   (b) conducting solid-liquid separation of the solid compound and lithium hydrosulfide present from the reaction system at a temperature of 50 to 150° C. after said step (a) without reducing pressure or bubbling an inert gas, and
   (c) washing the separated solid compound with an aprotic solvent after said step (b) to recover lithium hydrosulfide contained in the solid compound.

* * * * *

UNITED STATES PATENT AND TRADEMARK OFFICE
CERTIFICATE OF CORRECTION

PATENT NO. : 6,503,473 B1
DATED : January 7, 2003
INVENTOR(S) : Akiba

It is certified that error appears in the above-identified patent and that said Letters Patent is hereby corrected as shown below:

<u>Title page,</u>
Item [45] and the Notice information should read as follows:
-- [45] Date of Patent: *Jan. 7, 2003

[*] Notice:   This patent issued on a continued prosecution application filed under 37 CFR 1.53(d), and is subject to the twenty year patent term provisions of 35 U.S.C. 154(a)(2)

Subject to any disclaimer, the term of this patent is extended or adjusted under 35 U.S.C 154(b) by 0 days. --

Signed and Sealed this

Third Day of June, 2003

JAMES E. ROGAN
*Director of the United States Patent and Trademark Office*